United States Patent

Menendez et al.

[11] 3,902,894
[45] Sept. 2, 1975

[54] REFINING PROCESS FOR ZINC RECOVERY

[76] Inventors: Juan Blas Sitges Menendez, Arnao, Castrillon; Perfecto Martin Sagrado, Salinas, Castrillon, both of Oviedo; Alfonso Sanz Alonso, Paseo de la Infanta Isabel 17, Madrid, all of Spain

[22] Filed: Sept. 20, 1973

[21] Appl. No.: 399,158

Related U.S. Application Data

[63] Continuation-in-part of Ser. No. 171,170, Aug. 12, 1971, abandoned.

[52] U.S. Cl. ................................. 75/86; 75/63
[51] Int. Cl.² ......................................... C22B 19/30
[58] Field of Search............... 75/86, 63, 93 R, 93 A, 75/94

[56] References Cited
UNITED STATES PATENTS

448,802   3/1891   Richards ............................... 75/63

OTHER PUBLICATIONS

Ruppert et al. Bureau of Mines RI6417 1964 pp. 1–9, 75–86.

Perry's Chem. Engineers Handbook 4th Ed. 1963 pp. 19-5, 19-10, 19-11.

*Primary Examiner*—L. Dewayne Rutledge
*Assistant Examiner*—M. J. Andrews
*Attorney, Agent, or Firm*—McGlew and Tuttle

[57] ABSTRACT

A process of recovering zinc, contained in scrap, residues and mattes in amounts up to ninety-eight percent of the base metal of the scrap or matte, with a minimum of iron impurities, involves melting zinc-containing material in a reactor fitted with a removable agitator having a series of inclined vanes or blades attached to a rotor shaft driven by a motor. After melting thereof, the zinc-containing material is mixed in the reactor with a metal of Groups IIa and IIIa and/or alloy thereof and the resultant mixture is agitated by means of the agitator, thus impelling the mass in a vertical flow from the top to the bottom of the reactor, in the center of mass, and from the bottom to the top along the periphery of the mass. Thereafter, the oxides in finely powdered form are recovered from the surface of the molten zinc, which latter, now substantially pure, is removed and cooled in ingots.

9 Claims, 5 Drawing Figures

INVENTORS
JUAN BLAS SITGES MENENDEZ
PERFECTO MARTIN SAGRADO
BY ALFONSO SANZ ALONSO

ATTORNEY

REFINING PROCESS FOR ZINC RECOVERY

CROSS REFERENCE TO RELATED APPLICATION

This application is a continuation-in-part of copending application Ser. No. 171,170, filed Aug. 12, 1971, for "REFINING PROCESS AND REACTOR FOR ZINC RECOVERY" now abandoned.

FIELD AND BACKGROUND OF THE INVENTION

The present invention relates to a refining process and reactor for the recovery of zinc from galvanization mattes, scrap and residues of this metal. The process is carried out by means of a reactor which presents as its main characteristic an extremely simple and economical construction, its handling being further so simple that it can be carried out by unskilled personnel.

As it is known, the mattes from a galvanization process consist essentially of a mixture of zinc-iron compounds with occluded zinc. It has been possible to provide the presence of a stable phase, which contains 6 to 6.25% Fe, in equilibrium with molten zinc at the galvanization temperature. However, the quantity of zinc is greater since the alloy $FeZn_3$, in zeta phase, retains zinc mechanically. The greater part of the iron existing in the matte is present as zeta phase which settles at the bottom of the molten bath, being periodically extracted therefrom. However, it is extremely rare that this separation proceeds completely, and the matte invariably contains occluded zinc. Due to the variations in the quantity of occluded zinc, the iron content of the matte varies from 3 to 4% and even more.

The iron contained in the galvanization matte derives mainly from three sources, namely:

The pickling salts not eliminated during rinsing.

The iron salts formed due to the action of the flux on the object to be galvanized.

The direct attack of the object to be galvanized and of the galvanization pan by the molten zinc.

In general, the quantity of matte formed varies from 10 to 30% of the commercial zinc consumed and is normally lower when articles of simple configuration with smooth surfaces are galvanized. The factors which affect the formation of the mattes are the temperature of the bath, time of immersion, surface state of the steel and composition of the bath. The most important of all these factors is the temperature of the galvanization bath.

Consequently, it is easy to see the economic value contained in these galvanization mattes, so that the demand of all galvanizers for a process which permits the recovery of the zinc from the galvanization mattes, with high yields, is every increasing.

To the end of solving the problem of the recovery of zinc from the galvanization mattes, there have been developed until now various processes, some based on the partial recovery and others based on the complete recovery of the zinc.

As is logical, and since the present invention directs itself to a process of complete recovery of the zinc, the processes of the prior art based on the partial recovery of the zinc offer little interest with respect to the scope of this invention, so that there will be cited below only some of the processes of the prior art based on the complete recovery of the zinc from galvanization mattes, although it must be understood that this is done exclusively for comparative purposes.

The processes of complete recovery of the zinc from the galvanization mattes are based on the greater affinity of the dissolved iron for aluminum, such as the so-called "aluminum process," or in the distillation of zinc at atmospheric pressure or under vacuum.

The mentioned aluminum process is based on the following factors:

1. Aluminum has greater affinity for iron than for zinc and can displace it from the crystals of zeta phase (the zeta phase contains 6 – 6.25% Fe, zinc constituting the balance of the phase Z $FeZn_3$). In the practice, however, the quantity of zinc is greater because the Z alloy retains zinc mechanically.

The iron and aluminum alloy $FeAl_3$ requires 1.5 parts of Al for each part of iron.

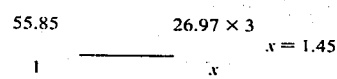

The zeta alloy has approximately 15.5 parts of zinc for each part of iron, as it has 94% of Zn and 6% of Fe.

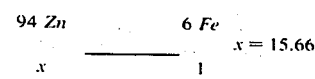

If we have a matte with 4% of Fe, we must add 4 × 1.5 = 6kg of Al for each 100 kg of matte. There will be obtained 10 kg of $FeAl_3$ alloy and 96 kg of Zn free of Fe.

2. The $FeAl_3$ alloy which is formed is much lighter than the molten zinc and has a high melting point, 1,150°C. The density of this alloy is approximately 3.68 g/cm3, or half the density of the zinc employed in galvanization, which is 7.04 g/cm3. The alloy floats on the molten bath and is easier to separate than in the case of the matte. The removal of the froth from the surface is easier and more efficient than in the process of evacuation currently followed for separating the bottom zeta alloy from the bath of molten zinc.

The aluminum process has not attained commercial acceptance due to the following reasons: (1) the yield is somewhat low, since only approximately 60% of the zinc is recovered; (2) the recovered zinc usually has a high aluminum content; (3) the separated $FeAl_3$ alloy is mixed with much zinc and is not marketable; and (4) the consumption of aluminum necessary for the process increases the cost.

Subsequently another process, called modified aluminum process, was developed:

This process is based on the fact that aluminum has greater affinity for iron than for zinc and that zinc dissolves in molten lead with a greater solubility, which ranges from 2% at the solidification temperature to 14% at 720°C. The process consists in melting lead in a cast iron vessel and addingto it 10% by weight of matte. The temperature of the bath is brought to 700°C. When all the zinc of the matte is dissolved in the molten lead, there is added a quantity of aluminum equivalent to 1.5 parts of the iron content of the charge. The Fe-Al alloy separates and floats at the top, the separation between the lead and the Fe-Al alloy being complete due to the greater difference in their densities. The Fe-Al alloy is finally skimmed from the lead bath. Then the Pb-Zn solution is allowed to cool sufficiently to separate the zinc. The zinc may be allowed to settle and is then separated, or it may be separated before the formation of crust. The lead of the bath may be recycled in subsequent operations; the zinc thus recovered contains approximately 0.2 to 0.3% Fe and contains small quantities of aluminum and lead.

Recently, a new laboratory scale process has been developed in the U.S. Bureau of Mines.

This process has for its object to recover the zinc from zinc mattes and the aluminum from pressure-cast zinc alloys. The zinc matte and the scrap of pressure-cast zinc alloys are melted together, in adequate proportions, so as to cause the formation of the intermetallic solid $Fe_2Al_5$, which is easily removed from the molten mass, by filtration and centrifugation. It has been possible to obtain a recovery of up to 92% of the available zinc. The refined zinc contained 0.02% Fe and 0.2% Al. The Al content was then reduced to less than 0.01% by melting with $ZnCl_2$.

It should be pointed out that only an inexpensive equipment is needed, when the operating temperature is low. The process seems to be attractive with a view to the recovery of zinc from scrap. Moreover, the aluminum requirements are low, since only 1.2 parts of aluminum are needed per part of iron, as against 1.5 parts per part of iron of the "aluminum process." This method would be utilizable if large quantities of scrap of pressure-cast zinc alloys were available. It has a limited application when there is a great demand for this scrap, as enough may not be available for the quantity of mattes produced. The "aluminum process" or the "modified aluminum process" appear to be perfect in principle, but they have difficulties of execution and one does not achieve a clear separation of the zinc and the lead bath, or of the $FeAl_3$ and the zinc bath. Moreover, the separated phases invariably carry with them entrained metallic lead or zinc. The process consumes considerable quantities of aluminum which is lost as $FeAl_3$. Although it is possible to employ it as an intermittent commercial method, it has not found much acceptance by the galvanizers, as it requires skill in its manipulation.

Among the processes of complete recovery, of the prior art, the distillation process has constituted the best technique for the recovery of zinc. This process involves subjecting the matte to distillation at elevated temperature, at atmospheric pressure, or to lower temperatures under reduced pressures. All who are versed in the metallurgy of zinc known this technique very well, so that we will not go into further details about it. However, it should be mentioned that the distillation process requires a high cost of installation and production and skilled labor, while the metallurgical yields are not very great.

On the other hand, this process depends very largely on the price of the mattes on the market, being "profitable" only when the price of the mattes is relatively low, since otherwise the high price of mattes would be added to the cost of production, in itself extremely high, so that the economic efficiency of the process would leave much to be desired, especially when taking into account that the yields in the recovery of zinc by this technique are not very acceptable.

SUMMARY OF THE INVENTION

In order to remedy the disadvantages existing in the above techniques of recovery of zinc from galvanization mattes, and to meet the rising demand of the world's galvanizers for an optimum process in all respects, the present invention is directed to a process and apparatus whereby the recovery of zinc from said mattes proceeds with a metalurgically, especially high yield, of the order of 95-98% of the zinc present in the starting product, while the carrying into practice thereof occurs at a low installation and production cost, the employment of specialized labor being unnecessary and a zinc of high commercial purity being obtained.

All these objectives are achieved, suprisingly, by the new process of the present invention.

This invention is based, in principle, on the fact that the metals of groups IIa and IIIa of the Periodic System of Elements, as well as the alloys of metals of both groups, have greater affinity for iron than for zinc, being able to displace the zinc, which is the zinc of the crystals of the zetal phase $FeZn_3$. The elements or metals of the mentioned groups are beryllium, magnesium, calcium, boron and aluminum, these metals being able to displace iron from the crystals of the Zn-Fe compound.

The raw materials to be used in the process of this invention are chiefly the mattes from operations of galvanization and all scrap and residues which contain zinc, whose recovery is interesting, logically, from an economical point of view. However, the process of the invention will hereinafter be described using the galvanization mattes as raw material without thereby limiting the scope of this invention to the use of said mattes, as it has been possible to prove that the present process is prodigious with identical efficiency when using other raw materials that contain zinc.

The refining process for the recovery of zinc from galvanization mattes, scrap and residues of this metal is characterized in that it comprises essentially the following steps:

a. melting the mattes, scrap or residues of zinc until a liquid phase is obtained;

b. adding to the molten mass a metal selected from among the groups IIa and IIIa and/or an alloy thereof; and c. treating the mass in the reactor to cause the disintegration thereof, favoring the formation and separation of oxides and aluminides, by means of the turboagitator contained in the reactor which impels the mass toward the bottom thereof hitting it and the walls of said reactor, thereby obtaining a closed cycle flow in vertical direction from top to bottom through the center of the mass and from bottom to top along the periphery, cut or interrupted by the blades of the truboagitator.

The invention apparatus permits obtaining the maximum yield in recovering up to 98% of the base metal of the scrap or galvanization matte, with the product obtained having a minimum of iron as impurities.

Another of the advantages of the apparatus of the invention is the short time which it is necessary to maintain it in operation to achieve the separation of the iron contained in the matte or scrap of the base metal (zinc), as this time may be, after the scrap or matte is melted, some 30 minutes, depending on the conditions in which the molten mass is present when the process starts and other variables that intervene therein. If these conditions are the ideal ones, a thing easy to achieve, the reaction time will be quite a bit less than that stated above.

In accordance with the invention, the reactor consists of a vat, intended to contain the mattes, scrap or residues in molten state, in which is lodged an agitator serving to circulate the molten mass in downward and upward currents.

This agitator is mounted on an axial shaft, which has its upper end connected to a driving motor, the agitator being arranged removably to permit its introduction and extraction when the process starts and ends.

The vat may be of the usual kind, of those intended to contain molten metals, and it may or may not have a burner. In the former case, the scrap or matte will be melted in the vat itself, and in the latter case it will be melted in a separate furnace and transferred to the vat, constituting the reactor, already in the molten state.

The vat is further equipped with an outlet for fumes and gases which are conducted to the outside through a separation chamber which permits recovering the oxides of the base metal, since in certain cases, for example, if the recovery of zinc is concerned, the small quantity of oxides of this metal is of great value.

The agitator is formed, at least, by a rotor with a series of radial blades having a certain inclination to obtain the circulation of the molten mass in the above-stated manner.

The rotor may also have a peripheral ring around the vanes, which extend between the sahft and the ring.

The ring may be movable or fixed. In the former case, it is integral with the vanes and in the latter independent thereof.

The diameter of the rotor is a function of the diameter of the vat to obtain the desired flow of the molten mass, which is impelled toward the bottom of the vat through the center in order to return upward along the periphery, on the walls of the vat.

The vat will preferably be collapsible to facilitate the extraction of the molten metal.

The rotor, together with the shaft carrying it, and the motor or driving elements may be mounted on a vertically displaceable block mounted on a support which, in turn, is displaceable on rails, or pivotable, so that, besides extracting the rotor from the vat, it can be displaced laterally to free the vat and thus to facilitate its manipulation.

This system further permits disposing of a cover or lid which falls on the vat closing the mouth thereof during the operation of the rotor to avoid spatter, the cover being equipped with a mouth for the discharge of fumes. This cover may also be traversed by a duct for the entrance of air, when this is desired to facilitate and accelerate the reaction.

The rotor shaft may be cooled internally to avoid the transmission of heat to the upper mechanical elements, such as bearings, transmissions, etc.

For an understanding of the principles of the invention, reference is made to the following description of typical embodiments thereof as illustrated in the accompanying drawings.

DESCRIPTION OF THE PREFERRED EMBODIMENTS

Figure 1:
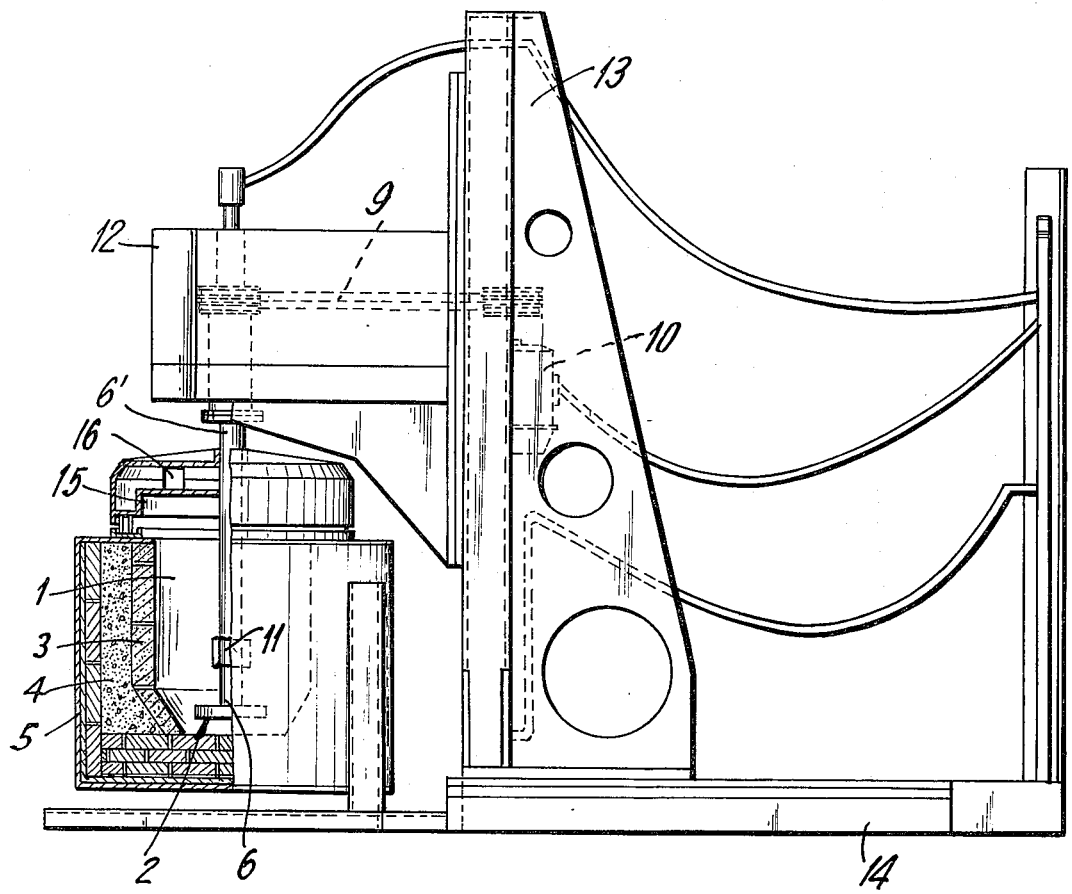
FIG. 1 is a side elevation of a reactor with the vat and cover partially in section.
Figure 2:
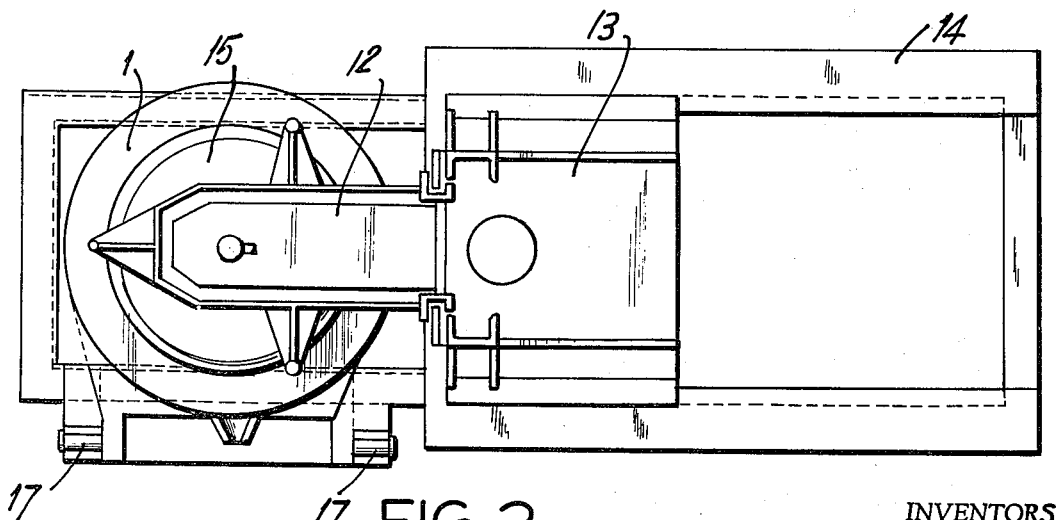
FIG. 2 is a plan view of the same reactor.
Figure 3:
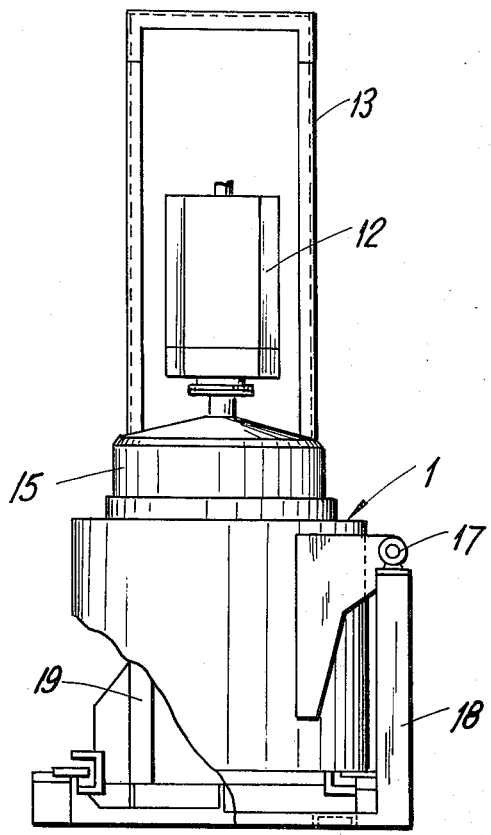
FIG. 3 is a front elevation view of the installation of FIGS. 1 and 2.

As can be seen in the drawings, the reactor is formed by a vat 1, intended to contain the molten metal, in which is lodged a gyratory rotor 2, which can be displaced axially.

Vat 1 comprises an inner lining 3 of special material (carborundum, graphite, etc.), an intermediate insulating filler 4 and an outer covering and carcass 5.

Figure 4:
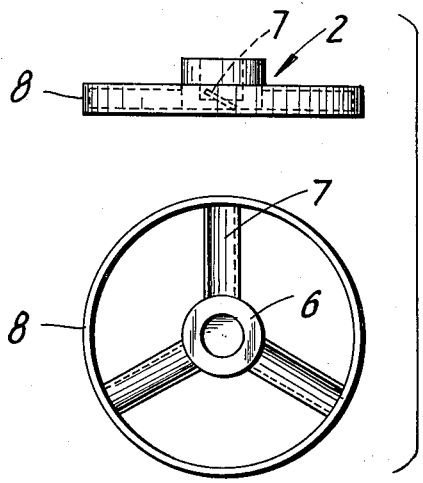
FIG. 4 is an elevation and plan view of a rotor with peripheral ring.
Figure 5:
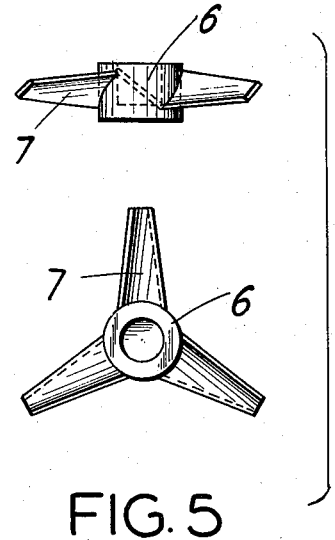
FIG. 5 is an elevation and plan view of a rotor without peripheral ring.

The reactor is formed by a shaft 6, from the lower end of which extend radially a series of inclined blades. This rotor, as is shown in FIGS. 4 and 5, can have blades 7 and a peripheral ring 8 which may be integral with the blades 7, or independent thereof, so that it turns together with the blades or is fixed. As is shown in FIG. 5, the rotor 2 may be formed only by the blades 7 without the peripheral ring 8.

Both the inclination of the blades 7 and the diameter of the rotor will be a function of the size of the vat, to obtain the flow of the molten mass from top to bottom through the center and from bottom to top along the periphery.

The upper end of shaft 6 is connected, by a system of pulleys 9, for example, to the drive motor 10.

Shaft 6 may consist of a lower portion integral with the rotor and of an upper portion 6' which is cooled internally to avoid the transmission of heat from the molten mass to the upper mechanical elements, such as bearings, transmission, etc., the two portions of the shaft being joined by means of a clamp 11.

Shaft 6' and the transmission and driving mechanisms may be mounted in a block 12 displaceable in vertical direction on a support 13, whin in turn can be displaced in a horizontal direction rails 14 to achieve the extraction and introduction of the rotor 2 in vat 1, and its displacement to a point sufficiently removed from the vat 1 to facilitate the tilting thereof. Support 13 may be gyratory pivotable whereby it is possible also to displace block 12 out of the vertical from vat 1.

Block 12 may carry also a cover 15 seated on the mouth of vat 1 when rotor 2 is introduced therein. This prevents spatter during the operation of the reactor, and the cover 15 may have a mouth 16 to which is connected a duct for extraction of fumes. This cover may also be traversed by a duct for the entrance of air in vat 1.

Vat 1 may be mounted for rotation about the pivots 17 on the support 18, to obtain its tilting by actuation of the jacks 19.

Although the vat shown is intended to receive the molten metal, it may be provided with burners and serve as melting vat at the same time.

During the rotation of the rotor 2, the molten mass is impelled toward the bottom of the vat, through the central part, hitting it and the walls, and ascending along the outer part, so that a closed-cycle flow is obtained in vertical direction from top to bottom through the center of the mass and from bottom to top along the periphery, cutting or interrupted by the blades of the agitator.

The duct for extraction of fumes, which is connected to the mouth 16 of cover 15, discharges into a separation chamber for the collection of the oxides which may be produced.

The action of the agitator in the molten mass of the mattes or scrap causes the disintegration of this mass, favoring the formation of oxides and aluminides and their separation from the base metal which remains in a molten state and free from iron, the oxides and aluminides remaining in the form of ash on the molten mass, a base metal being obtained with a minimum of iron and whose recovery may reach percentages of up to 98%.

As mentioned in the preceding summary of the invention, the invention process, for the recovery of zinc from galvanization mattes, scrap and residues of this metal, comprises essentially the following steps:

a. melting the mattes, scrap or residues of zinc until a liquid phase is obtained;

b. adding to the molten mass a metal selected from among the groups IIa and IIIa and/or an alloy thereof; and c. treating the mass in the reactor to cause the disintegration thereof, favoring the formation and separation of oxides and aluminides, by means of the turboagitator contained in the reactor which impels the mass toward the bottom thereof hitting it and the walls of said reactor, thereby obtaining a closed-cycle flow in vertical direction from top to bottom through the center of the mass and from bottom to top along the periphery, cut or interrupted by the blades of the turboagitator.

It should be mentioned that the Zn oxides released in the reactor go to subsequent recovery in conventional filtration equipment, such as, for example, a sleeve filter.

For carrying out the second step, it is preferable to effect the addition of the metal selected from the groups IIa and IIIa and/or an alloy thereof at a temperature comprised between the liquidus temperature of the mass and 800°C, it being advisable to incorporate such metal and/or alloy in the form of scrap cuttings, shot, etc., so as to provide a large contact surface between them and the matte, scrap or molten residues which contain zinc.

Preferably aluminum is added to the melt of the zinc-containing material due to the great affinity for zinc and its easy availability of the market, as well as an alloy of this metal with zinc, as it has been found that for the optimum elimination of the iron contained in the molten mass the aluminum should be incorporated in a proportion of up to 1.2 parts by weight, referred to the iron present in the molten mass.

In connection with the foregoing, it should be indicated that the results of the analyses of the final zinc product are entirely surprising since with mattes of an iron content of the order of 6 to 7% it has been possible to obtain final products in which the percentage of iron was reduced to some tenths, yielding a zinc so pure as to completely satisfy the commerical-industrial requirements. On the other hand, in case an excess quantity of aluminum is used, there will be obtained a final aluminum and zinc based product which is likewise of great commercial-industrial utility as zinc-aluminum alloy.

As mentioned above, aluminum constitutes the preferred metal to be added to the zinc-containing molten mass. However, and although the invention will be described hereinafter with special reference to this metal, the process described and claimed is not limited to the exclusive use of aluminum.

The third step of the process is carried out, as has been said before, in the reactor equipped with the turboagitator in which, when the reaction is completed, there float on the molten zinc, entirely separated therefrom, iron oxides and aluminides in a pulverulent state totally free of metallic zinc which, as the molten zinc is ingoted, are easily retained or separated with any manual tool.

An important characteristic of the process of this invention resides in that the reactor can be used as the melting furnace of the mattes and simultaneously as the reactor.

The principal variables which govern the refining process for the recovery of the zinc from the galvanization mattes and other residues which contain this metal are the temperature of the reactor; the temperature of the molten mattes; the speed of the turboagitator of the reactor; the diameter of the turboagitator, which in turn is a function of the diameter of the reactor; the length of the blades of the turboagitator; the inclination of the blades of the turboagitator; the percentage of metal of groups IIa and IIIa and/or alloy thereof, preferably aluminum, referred to the iron content; and the depth of the turboagitator in the metal bath; all these variables, which decisively govern the yield of recovery of zinc, being intimately interrelated.

Also, it has been possible to prove the desirability of introducing a stream of oxygen into the reactor, since in this way the reaction is surprisingly accelerated.

From the foregoing description, it will be noted that the reactor includes an agitator on a central vertical shaft in the reactor, this shaft being rotated, for example, by a transmission connected to its upper end. The agitator has helicoidal blades at its lower end which lower end is within the molten mass, at a given height, so that, when the agitator is rotated, there is produced a current of molten metal flowing centrally downwardly then radially outwardly then peripherally upwardly and then radially inwardly.

The reaction effected in the reactor, with respect to the molten metal, is a type of exothermic reaction and, upon injecting air enriched with oxygen, as previously mentioned, there is caused an oxidation of the metal compounds of iron and aluminum to the state of a fine powder in suspension and which, because of its low density, emerges from the molten mass, during agitation, to the surface thereof. It is therefore possible to remove this powder by aspiration or any other physical or mechanical means. As a final result, the metal remaining in the reactor is simply zinc with such a high percentage of purity that, in its later analysis, it may be considered as a physically pure zinc.

The following important parts of the process should be taken into account. The reaction is an exothermic reaction of oxidation, and the agitation is not a typically simple and arbitrary agitation but rather an oxidation agitation which is completely controlled with respect to the initial temperature, the angular velocity of the agitator, the precentage of aluminum and the addition of hot air. Thus, the reactor has to have precise measurements with respect to the relation of the diameter of the reactor and the diameter of the agitating blades, as well as the depth of introduction of the agitator into the molten mass.

Inasmuch as the compound $M_rFe_2$ requires different amounts of each of the reactive elements beryl, magnesium, calcium, boron and aluminum, these are needed in different stoichiometric amounts to form the compound $M_rFe_2$. Nevertheless, it is known that, in geometrically similar liquid systems, there is attained a kinematic similarity when there is a dynamic identity and when the flow patterns, whether laminar or turbulent, are similar. By virtue of this, the relations of mass transfer can be used in calculating the parameters of agitators and reactors.

Likewise, the amounts of Al, Be B, Mg and Ca used for each kilogram of iron contained in the melted mass are as follows:

Aluminum from 1 to 1.2 kg.
Beryllium from 0.3 to 0.4 kg.
Magnesium from 0.3 to 0.5 kg.
Boron from 0.3 to 0.5 kg.
Calcium from 1.5 to 1.7 kg.

The diameter of the reactor and the other parameters are a function of the capacity of the treatment. As an example and for the treatment of 500 kg. the measurements of the reactor are:

Inside diameter, 800 mm. The speed of the turboagitator is about 850 rpm. The length of the blades is 530 mm equal to the diameter of the surface described by such blades which, in turn, have a 45° inclination in respect of the plane of rotation and they are three 120° apart.

Below are given the following Examples 1 to 4 which illustrate in greater detail the process of the present invention. In all these examples, mattes from galvanization are used as raw material, and aluminum is used as the metal of groups IIa and IIIa. Naturally, it must be understood that these examples are given only by way of illustration without intending in any way to limit the scope of the present invention.

EXAMPLE 1

In the reactor of the present invention, there were charged 500 kg of a galvanization matte with the following analysis,

| Zn | total | 95.98% |
|----|-------|--------|
| Zn | metal | 92.— % |
| Pb |  | 0.64% |
| Fe |  | 2.93% |
| Sn |  | 0.14% |
| Al |  | 0.15% |
| Cd |  | 0.02% |
| Cu |  | 0.011% |
| Ag |  | 0.001% |
| Mg |  | 0.004% |
| SiO$_2$ |  | 0.017% | which was then melted. After the mass was melted and at a temperature below 650°C, the aluminum was incorporated and subjected to agitation using a turboagitator at a speed above 800 rpm. After the reaction was completed, which took approximately 20 minutes, the mentioned pulverulent mass of iron oxides and aluminides and othermetals contained in the matter were extracted, a zinc product being recovered which offered the following analysis:

Analysis of the Zn obtained: Fe = 0.12    Al = 0.27
Metallurgical balance — total Zn contained        479.90

-Continued

| Zn metal contained in mattes | 460 kg |
|---|---|
| Zn metal obtained | 426 kg |
| Crude oxides recovered | 70 kg |
| Yield referred to Zn metal contained 92.6% | |

EXAMPLE 2

The process of Example 1 was repeated, but using 500 kg of a matte containing 6% iron and 90.2% Zn metal. In this example, the speed of the turboagitator was above 900 rpm. The reaction time was about 22 minutes.

The following results were obtained:

| Analysis of the Zn obtained: Fe = 0.17 | Al = 0.29 |
|---|---|
| Zn metal contained in mattes | 451 kg |
| Zn metal obtained | 406 kg |
| Crude oxides recovered | 90 kg |
| Yield referred to Zn metal contained | 90% |

EXAMPLE 3

The process of example 1 was repeated, but using 300 kg of a matte containing 2.4% of iron and 92.8% of zinc metal. In this example, the speed of the turboagitator was above 850 rpm. The reaction time was about 18 minutes.

The following results were obtained:

| Analysis of the Zn obtained: Fe = 0.08 | Al = 0.18 |
|---|---|
| Zn metal contained in mattes | 278.4 kg |
| Zn metal obtained | 251.— kg |
| Crude oxides recovered | 46.— kg |
| Yield referred to Zn metal contained | 90.1% |

EXAMPLE 4

The process of Example 1 was repeated, but using 500 kg of a matte containing 5.20% of iron and 91% of zinc metal. However, in this example the temperature of the molten mattes was above 650°C and the speed of the turboagitator below 700 rpm. The reaction time was 2 hours and 20 minutes.

The results were the following:

| Analysis of the Zn obtained: | Fe = 0.20 | Al = 0.47 |
|---|---|---|
| Zn metal contained | 455 kg | |
| Zn metal obtained | 401 kg | |
| Crude oxides recovered | 92 kg | |
| Yield referred to Zn metal contained | 88.10 | |

As can be noted, this example illustrates the excessively logn reaction time obtained when the temperature of the mattes and the speed of the turboagitator are changed. However, the yield obtained is similarly excellent, equal to those obtained in the previous examples.

While specific embodiments of the invention have benn shown and described in detail to illustrate the application of the principles of the invention, it will be understood that the invention may be embodied otherwise without departing from such principles.

What is claimed is:

1. Refining process for the recovery of zinc metal from iron-containing galvanization mattes, scrap and residues of zinc metal, said process comprising, in a first step, melting the mattes, scrap and residues of zinc to obtain a mass thereof in the liquid phase; in a second step, adding to the molten mass a metal selected from the group consisting of beryllium, magnesium, calcium, boron and aluminum and alloys thereof, while maintaining the temperature of the molten mass at least substantially constant at a value above the melting point; in a third step, agitating the molten mass and the added metal in a reactor, by an agitator rotating about a vertical axis, to effect a cyclic circulation thereof centrally downwardly, then radially outwardly, then peripherally upwardly, and then radially inwardly of the reactor, while directing a flow of hot oxygen-containing gas onto the surface of the melt; continuing such agitation of the molten mass, while maintaining the temperature at least substantially constant above the melting point of the molten mass and while maintaining such flow of oxygencontaining gas, for a time sufficient to react the added metal with the molten mass until the intermetallic compound of the iron and the added metal becomes an oxidized formation, with a complex composition and a high melting point, and these impurities become a very fine dry powder floating on the surface of the molten zinc, easily separated from the still molten and substantially pure zinc; and pouring the molten zinc into molds while mechanically separating the fine powder from the molten zinc.

2. Process according to claim 1 in which the addition of the metal is carried out at a temperature comprised between the liquidus temperature of the mass and 800°c.

3. Process according to claim 1, in which aluminum is added to the molten zinc-containing mass.

4. Process according to claim 1, in which an aluminum-zinc alloy is added to the molten zinc-containing mass.

5. Process according to claim 3, in which the aluminum is added in an amount proportional to the percentage of iron contained in the molten mass and sufficient to eliminate all the iron from the molten mass by reaction therewith.

6. Process according to claim 5, wherein the addition of aluminum is carried out at a temperature between the melting point of the mass and about 650°C.

7. Process according to claim 1, in which the zinc-containing mass and addition of the selected metal thereto is carried out at a temperature below about 650°C and the agitator speed is about 800 rpm, said process being carried out over a period of about 20 minutes.

8. Process according to claim 7 in which the agitator speed in the reaction is above about 900 rpm and the process is carried out over a period of about 22 minutes.

9. Process according to claim 7, in which the agitator speed is about 850 rpm and the reaction time about 18 minutes.

* * * * *